(12) United States Patent
Xu

(10) Patent No.: US 11,440,797 B2
(45) Date of Patent: Sep. 13, 2022

(54) PARTIAL OXIDATION OF HYDROCARBONS

(71) Applicant: Bang-Cheng Xu, Houston, TX (US)

(72) Inventor: Bang-Cheng Xu, Houston, TX (US)

( * ) Notice: Subject to any disclaimer, the term of this patent is extended or adjusted under 35 U.S.C. 154(b) by 484 days.

(21) Appl. No.: 16/508,759

(22) Filed: Jul. 11, 2019

(65) Prior Publication Data
US 2021/0009413 A1 Jan. 14, 2021

(51) Int. Cl.
*C01B 3/40* (2006.01)
*B01J 23/888* (2006.01)
*B01J 23/755* (2006.01)
*B01J 35/00* (2006.01)
*B01J 35/06* (2006.01)

(52) U.S. Cl.
CPC ............... *C01B 3/40* (2013.01); *B01J 23/755* (2013.01); *B01J 23/888* (2013.01); *B01J 35/002* (2013.01); *B01J 35/06* (2013.01); *C01B 2203/0261* (2013.01); *C01B 2203/1058* (2013.01); *C01B 2203/1235* (2013.01); *C01B 2203/142* (2013.01)

(58) Field of Classification Search
CPC ......... C01B 3/40; B01J 23/755; B01J 23/888; B01J 35/002; B01J 35/06
USPC .......................................................... 252/373
See application file for complete search history.

(56) References Cited

U.S. PATENT DOCUMENTS

| 7,981,397 B2 | 7/2011 | Xu | |
| 2005/0250863 A1* | 11/2005 | Green | B01J 23/755 518/703 |
| 2009/0026420 A1* | 1/2009 | Xu | C01B 3/386 252/373 |

FOREIGN PATENT DOCUMENTS

WO 01/32556 A1 5/2001

* cited by examiner

*Primary Examiner* — Douglas B Call
(74) *Attorney, Agent, or Firm* — The Marbury Law Group, PLLC

(57) ABSTRACT

A process of catalytic partial oxidation of hydrocarbons, particularly methane and/or natural gas to form a product containing hydrogen and carbon monoxide where the first catalyst comprises Co—Ni—Cr—W alloy.

28 Claims, 2 Drawing Sheets

PARTIAL OXIDATION OF HYDROCARBONS

TECHNICAL FIELD

The present invention generally relates to catalytic partial oxidations of hydrocarbons to produce a product mixture comprising hydrogen and carbon monoxide.

BACKGROUND

Oil production is quickly reaching its peak and it is expected that natural gas will increasingly become the starting material of choice for energy production and/or feedstock for industrial chemical processes. Usually natural gas, which comprises mostly methane, is converted to synthesis gas (used hereinafter interchangeably as "syngas") first. Syngas generally refers to a mixture of carbon monoxide and hydrogen. Syngas then is converted to different products in subsequent reaction or reactions. Methods of producing syngas are discussed in U.S. Pat. No. 7,981,397, hereby incorporated by reference in its entirety.

It is desirable to have a catalytic partial oxidation reaction process which can (a) reduce the initial complete oxidation of hydrocarbon feed, such as methane, and/or natural gas and/or other organic compound mixtures to reduce the temperature rise in the front of the reactor or reaction system and at the same time and/or (b) maintain as high as possible a temperature in the rest of the reactor or reaction system in order to maintain a reasonable reaction rate for reforming reactions to convert undesirable complete oxidation products, water and $CO_2$, to form additional synthesis gas—hydrogen and CO.

SUMMARY OF THE INVENTION

An embodiment relates to a catalytic partial oxidation process comprising passing a feed stream comprising a hydrocarbon feedstock and oxygen or an oxygen containing mixture through a reactor having at least a first reaction zone and a subsequent second reaction zone. The catalytic partial oxidation process produces an effluent stream comprising carbon monoxide and hydrogen. The first reaction zone may comprise a first catalyst having a first surface area and a first thermal conductivity, the first catalyst may comprise a Co—Ni—Cr—W alloy. The second reaction zone may comprise a second catalyst having a second surface area and a second thermal conductivity, the second catalyst may comprise a second metal supported on a carrier. The first surface area of the first catalyst is lower than the second surface area of the second catalyst. The first thermal conductivity of the first catalyst may be at least 0.05 $cal/cm^2/cm/second/°C$ at operating temperatures. The first thermal conductivity of the first catalyst may be higher than the second thermal conductivity of the second catalyst. A pressure in said reactor may be between about 600 kPa and about 7,500 kPa.

Another embodiment relates to a catalytic partial oxidation process comprising passing a feed stream comprising a hydrocarbon feedstock and oxygen or an oxygen containing mixture through a reactor having at least a first reaction zone and a subsequent second reaction zone. The catalytic partial oxidation process producing an effluent stream comprising carbon monoxide and hydrogen. The first reaction zone may contain a first catalyst having a first surface area and a first thermal conductivity, the first catalyst being supported and comprising the first catalyst comprising a Co—Ni—Cr—W alloy, wherein the first surface area may be less than about 1.0 square meter per gram ($m^2/g$) and the second reaction zone may contain a second catalyst having a second surface area and a second thermal conductivity, the second catalyst comprising a second metal supported on a carrier. The first reaction zone may comprise a first catalyst carrier comprising one or more metallic substances with a high thermal conductivity. The first surface area of the first catalyst may be lower than the second surface area of the second catalyst. The first thermal conductivity of the first catalyst may be at least 0.05 $cal/cm^2/cm/second/°C$ at operating temperatures. The first thermal conductivity of the first catalyst may be higher than the second thermal conductivity of the second catalyst.

Another embodiment relates to a catalytic partial oxidation process comprising passing a feed stream comprising a hydrocarbon feedstock and oxygen or an oxygen containing mixture through a reactor having at least a first reaction zone and a subsequent second reaction zone. The catalytic partial oxidation process producing an effluent stream comprising carbon monoxide and hydrogen. The first reaction zone may contain a first catalyst having a first surface area and a first thermal conductivity, the first catalyst being unsupported and comprising the first catalyst comprising a Co—Ni—Cr—W alloy, wherein the first surface area may be less than about 1.0 square meter per gram ($m^2/g$) and the second reaction zone may contain a second catalyst having a second surface area and a second thermal conductivity, the second catalyst comprising a second metal supported on a carrier. The first surface area of the first catalyst may be lower than the second surface area of the second catalyst. The first thermal conductivity of the first catalyst may be at least 0.05 $cal/cm^2/cm/second/°C$ at operating temperatures. The pressure may be in the range of from about 600 kPa to about 7,500 kPa. The first thermal conductivity of the first catalyst may be higher than the second thermal conductivity of the second catalyst.

An embodiment relates to a catalytic partial oxidation process which comprises passing a feed stream through at least a first reaction zone and subsequently a second reaction zone, wherein the first reaction zone containing a first catalyst. The first catalyst comprises a first material in a first shape selected from the group consisting of porous foam, gauze, mesh, honeycomb, monolith, cloth, wire, pellet, trilobe, ring, extrudate, sphere, bead, particulate, granule, and mixtures thereof. The first material comprises at least one first metal supported on at least one low surface area carrier with a first surface area less than about 1.0 square meter per gram ($m^2/g$) and a first thermal conductivity. The second reaction zone containing a second catalyst having a second surface area and a second thermal conductivity. The second catalyst comprises a second metal supported on a high surface area carrier to produce an effluent stream comprising carbon monoxide and hydrogen. The feed stream comprises (a) a hydrocarbon feedstock, and (b) oxygen or an oxygen containing mixture. The first surface area of the first catalyst is lower than the second surface area of the second catalyst. The first thermal conductivity of the first catalyst is higher than the second thermal conductivity of the second catalyst.

Another embodiment relates to a catalytic partial oxidation process wherein the first metal of the first catalyst is selected from the group consisting of iron, cobalt, nickel, ruthenium, rhodium, palladium, osmium, iridium, platinum, titanium, vanadium, chromium, molybdenum, tungsten, alloys thereof, and mixtures thereof. The first metal is in a form selected from the group consisting of reduced forms of one or more metals, oxidized forms of one or more metals, one or more alloys, and mixtures thereof; and/or the second metal is selected from the group consisting of iron, cobalt, nickel, ruthenium, rhodium, palladium, osmium, iridium, platinum, lanthanum, cerium, gadolinium, praseodymium, neodymium, dysprosium, holmium, ytterbium, samarium europium, erbium, terbium, lutetium, thorium, uranium, and mixtures thereof. The second catalyst further comprises a promoter metal selected from the group consisting of lanthanum, cerium, gadolinium, praseodymium, neodymium, dysprosium, holmium, ytterbium, samarium europium, erbium, terbium, lutetium, thorium, uranium, and mixtures thereof.

A further aspect relates to a catalytic partial oxidation process wherein a side feed component is added between the first catalyst and the second catalyst wherein the feed component is selected from the group consisting of a recycle gas, steam, hydrogen, carbon dioxide, carbon monoxide, methane, and mixtures thereof.

Another embodiment relates to the conversion of a hydrocarbon, including but not limited to methane, in a process according to the instant invention is at least 50%, preferably at least about 60%, more preferably at least about 70%, and most preferably at least 75%.

Another aspect of the present invention involves a catalytic process wherein the space velocity for the two catalysts is in the range of from about 1,000 to about 10,000,000 NL/kg/h, preferably from about 10,000 to about 1,000,000 NL/kg/h.

A further aspect of the present invention involves a process wherein the high surface area carrier is selected from the group consisting of one or more refractory metal oxides, one or more rare earth modified refractory metal oxides, one or more alkaline earth metal modified refractory metal oxides, and mixtures thereof; and/or the high surface area carrier is selected from the shape of sphere, pellet, trilobe, particulate, bead, ring, granule, and mixtures thereof; and/or the metal of the high surface area carrier is selected from the group consisting of oxides of aluminum, zirconium, magnesium, titanium, silicon, lanthanum, cerium, gadolinium, praseodymium, neodymium, dysprosium, holmium, ytterbium, samarium europium, erbium, terbium, lutetium, thorium, uranium, and mixtures thereof.

Another embodiment involves a catalytic hydrocarbon partial oxidation process, wherein the first metal, preferably a precious metal, of the first catalyst is coated, electroplated, diffusingly coated, or otherwise deposited onto the low surface area carrier which comprises one or more other metallic substances with a high thermal conductivity.

Yet another aspect relates to a catalytic partial oxidation process, wherein process comprises passing a feed stream through at least a first reaction zone and subsequently a second reaction zone. The first reaction zone containing a first catalyst. The first catalyst comprises a first material in a first shape selected from the group consisting of porous foam, gauze, mesh, honeycomb, monolith, cloth, wire, pellet, trilobe, ring, extrudate, sphere, particulate, bead, granule, and mixtures thereof, and a first thermal conductivity. The second reaction zone containing a second catalyst having a second surface area and a second thermal conductivity. The second catalyst comprises a second metal supported on a high surface area carrier to produce an effluent stream comprising carbon monoxide and hydrogen. The feed stream comprises (a) a hydrocarbon feedstock, and (b) oxygen or an oxygen containing mixture. The first surface area of the first catalyst is lower than the second surface area of the second catalyst. The first thermal conductivity of the first catalyst is higher than the second thermal conductivity of the second catalyst. The metal of the first catalyst is selected from the group consisting of iron, cobalt, nickel, ruthenium, rhodium, palladium, osmium, iridium, platinum, titanium, vanadium, chromium, molybdenum, tungsten, alloys thereof, and mixtures thereof and wherein the first metal is in a form selected from the group consisting of reduced forms of one or more metals, oxidized forms of one or more metals, one or more metal alloys, and mixtures thereof. The second metal is selected from the group consisting of iron, cobalt, nickel, ruthenium, rhodium, palladium, osmium, iridium, platinum, lanthanum, cerium, gadolinium, praseodymium, neodymium, dysprosium, holmium, ytterbium, samarium europium, erbium, terbium, lutetium, thorium, uranium, and mixtures thereof. The high surface area carrier is selected from the group consisting of one or more refractory metal oxides, one or more rare earth modified refractory metal oxides, one or more alkaline earth metal modified refractory metal oxides, and mixtures thereof. The high surface area carrier is selected from the shape of sphere, pellet, trilobe, particulate, bead, ring, granule, and mixtures thereof; the promoter metal is selected from the group consisting of lanthanum, cerium, gadolinium, praseodymium, neodymium, dysprosium, holmium, ytterbium, samarium europium, erbium, terbium, lutetium, thorium, uranium, and mixtures thereof. The space velocity is in the range of from about 10,000 to about 1,000,000 NL/kg/h. The inlet temperature is in the range of from about 250° C. to about 450° C. The pressure is in the range of from about 101 kPa to about 7,500 kPa. The atomic ratio of carbon of the feed stream to oxygen is in the range of from about 1.7:1 to about 2.3:1. Aside feed component is added optionally between the first catalyst and the second catalyst. The side feed component is selected from the group consisting of a recycle gas, steam, hydrogen, carbon dioxide, carbon monoxide, methane, and mixtures thereof.

DETAILED DESCRIPTION

Figure 1:
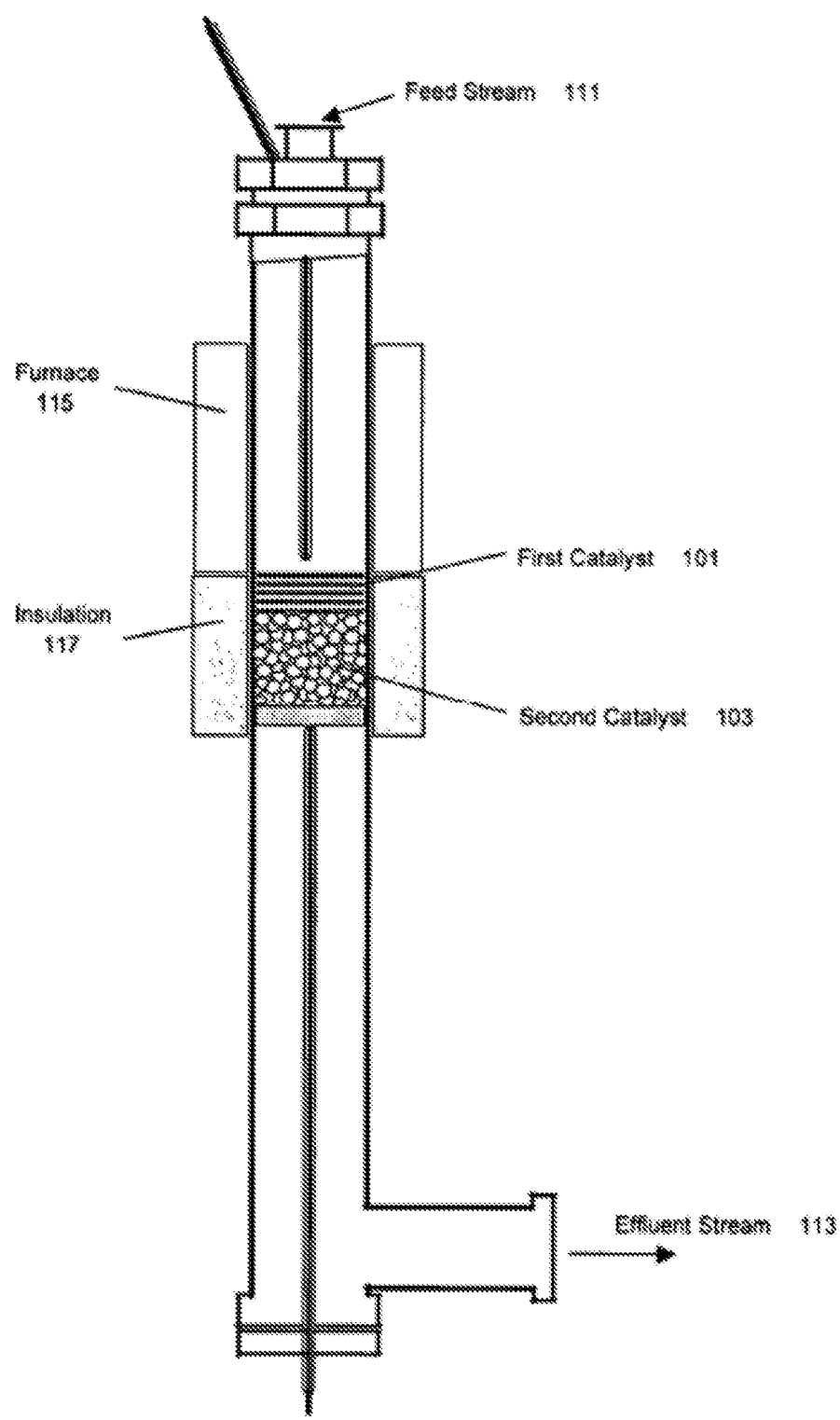
FIG. 1 is a schematic drawing of a catalytic reactor made of stainless steel suitable for laboratory scale tests of the catalysts of the preferred combination. The metal gauze catalyst is used at the catalyst top as the first metal catalyst. The first high surface area carrier supported porous catalyst is followed with the metal gauze catalyst to give large reaction surface.

Steam reforming has been the most commonly practiced commercial process for making syngas in the natural gas industry for many years. This reforming reaction is highly endothermic and requires heat input. The resultant of 3:1 $H_2$ to CO molar ratio syngas is not ideally suitable for methanol synthesis or Fischer-Tropsch reactions producing various hydrocarbon liquids. A stoichiometric equation of steam reforming of methane is shown below as equation (I):

$$CH_4 + H_2O = CO + 3H_2 \qquad (I)$$

Alternatively, a partial oxidation reaction of methane is mildly exothermic ($\Delta H°_{298} = -8.5$ kcal). The resultant of 2:1 $H_2$ to CO molar ratio syngas according to the equation (II) below produces the ideal stoichiometry for methanol synthesis or Fischer-Tropsch reactions.

$$CH_4 + 0.5O_2 = CO + 2H_2 \qquad (II)$$

The research on light hydrocarbon such as methane catalytic partial oxidation to make syngas has drawn greater attention since the early 1990s. Precious metals supported on porous ceramic monoliths or particulate solids as carriers are widely used as catalysts for carrying out such a partial oxidation reaction. In addition to the desired partial oxidation reaction, there are many side reactions. One of them is complete oxidation of methane as shown below. The complete oxidation reaction of methane or other hydrocarbons is much more exothermic than the desired partial oxidation reaction, thus releasing more heat.

$$CH_4 + 2O_2 = 2H_2O + CO_2 \quad (III)$$

There are always some amounts of the byproducts $H_2O$ and $CO_2$ along with the desired partial oxidation products $H_2$ and CO. Since there is also some un-reacted $CH_4$ in the product stream, certain reforming reactions such as (IV) and (V) below are possible side reactions in the reactor.

$$CH_4 + H_2O = CO + 3H_2 \quad (IV)$$

$$CH_4 + CO_2 = 2CO + 2H_2 \quad (V)$$

Because of the existence of the more exothermic complete methane (or other hydrocarbons) oxidation reaction, a high temperature hot area/zone is formed at top or front of the catalyst bed. It is commonly observed that the temperature rise in the hot area/zone is much higher than the partial oxidation adiabatic temperature as predicted by calculations or modeling. The high temperature rise may cause damages to the catalyst as the rate of catalyst deactivation increases with temperature. After the top layer catalyst is deactivated, the hot area/zone moves down along the catalyst bed. Consequently, it is typically observed in an experiment that the reaction system outlet temperature increases and the conversion and selectivity decrease with time.

Alternatively, the reforming reactions are strongly endothermic. As a result, the temperature along the catalyst bed in a reactor or reaction system decreases rather quickly and requires heat or thermal input to maintain the reaction rate. At high temperatures, the reforming reactions are very fast. The reforming reaction even can be very fast in gas phase without catalyst. But at low temperatures, the reforming slows down substantially. According to examples in International Patent Application No. WO0132556, 90% to 95% of the oxygen is consumed in a very thin reaction zone in the front, less than three particle diameters from the catalyst bed inlet. The particle size in the above patent example is in the range of 192 to 450 microns and the catalyst bed length is 10 mm. For a length of only three particles, the depth of the catalyst bed used for oxidation is only a small portion of the entire catalyst bed. Therefore, only reforming reactions take place in the rest of the catalyst bed.

From analytical and experimental results in converting hydrocarbons to syngas, partial oxidation reactions and other high exothermic undesirable side oxidation reactions to form $H_2O$ and $CO_2$ may be observed to occur at or near the top (inlet) of catalyst bed while reforming reactions take place later, following these oxidation reactions. Thus, it is desirable that there be at least two reaction zones or two catalyst beds. The first reaction zone contains a first catalyst, which comprises a first material in a certain shape to be discussed in more detail later herein.

Moreover, in an embodiment a first nickel catalyst in a first reaction zone may be replaced with an alloy that significantly improves the performance of a two catalyst bed reactor. The composition of the alloy is summarized in Table 1 below.

TABLE 1

| Carbon | 0.05-0.15 (wt %) |
|---|---|
| Manganese | 1.00-2.00 |
| Phosphorous | 0.0-0.03 |
| Sulfur | 0.0-0.03 |
| Silicon | 0.0-1.0 |
| Chromium | 19.0-21.0 |
| Nickel | 9.0-11.0 |
| Cobalt | Balance |
| Tungsten | 14.0-16.0 |
| Iron | 0.0-3.0 |

The first reaction zone with unsupported metal catalyst catalyzes primarily hydrocarbon oxidation reactions and possibly part of the reforming reaction at a high temperature. The second reaction zone with metal on porous carrier to carry out the reforming reaction is typically operated at a lower temperature. As discussed in more detail later, the two reaction zones and/or catalyst beds may be separated and a recycled gas, such as byproduct stream, may be added between these two reaction zones or two beds. Steam or $CO_2$ also may be added between two reaction zones or two beds to adjust the $H_2$ to CO ratio. The two reaction zones also may be put in the same vessel with or without distance or other materials/substances, inert or otherwise, in between.

It is within the scope of various embodiments that there are various inventive ways to improve the first catalyst if an unsupported porous foam, gauze, mesh, honeycomb, monolith, cloth, wire, pellet, trilobe, ring, extrudate, sphere, bead, particulate, granule, and mixtures is not used. The first catalyst material may comprise at least one first metal supported on at least one low surface area carrier with a first surface area less than about 1.0 square meter per gram ($m^2/g$) and a first thermal conductivity. For example, the catalyst on the top of the catalyst bed may be loaded with a large amount of metal to fill the pore, since the internal surface is not useful at the top and the heat conductivity could be increased with the pore full of metal. The metal fill amount in the catalyst may be reduced along the catalyst bed to increase the internal surface for the slower reforming reaction down the catalyst bed.

The first catalyst used in the first bed for partial/complete hydrocarbon oxidation reaction is preferably a metal, such as one or more precious metals, supported on a low-surface area carrier with a first surface area less than about 1.0 square meter per gram ($m^2/g$) and a first thermal conductivity. Precious metals such as Re, Rh, Pt may be coated, electroplated, diffusingly coated, or otherwise deposited onto cheaper metals such as Ni, Co, Al, Cu and mixtures thereof in a first shape selected from the group consisting of porous foam, gauze, mesh, honeycomb, monolith, cloth, wire, pellet, trilobe, ring, extrudate, sphere, bead, particulate, granule to reduce the catalyst cost. These precious metal(s) may also form metal alloys on the surface of such other cheaper metals.

There are various ways to improve the porous carrier catalyst if unsupported metal gauze or monolith is not used. The first catalyst on the top or beginning of the catalyst bed may be loaded with a suitable amount of a filler metal to fill the pore to increase the heat and thermal conductivity. The metal fill amount in the first catalyst may be reduced along the catalyst bed to increase the internal surface for the slower reforming reaction further down into the catalyst bed.

In other words, to reduce the usage of the first metal, it is also within the scope of various embodiments that the first metal may be coated on one or more other metallic substances. It is preferred that such one or more metallic substances also possess high thermal conductivities. A suitable metallic substance includes, but is not limited to, nickel, cobalt, aluminum, copper, alloys thereof and mixtures thereof. Other metallic substances may also be used provided that they exhibit good thermal conductivity and mechanical strength and that such metallic substances do not interfere substantially with the desired catalytic partial oxidation reaction of various embodiments to produce synthesis gas and/or other desired mixtures comprising carbon monoxide and hydrogen. One example is that the material or carrier itself is made of one or more such metallic substances.

As discussed, many metals may be suitable for various embodiments as the first metal for the first catalyst. In some embodiments, a suitable first metal of the first catalyst may be selected from the group consisting of iron, cobalt, nickel, ruthenium, rhodium, palladium, osmium, iridium, platinum, titanium, vanadium, chromium, molybdenum, tungsten, alloys thereof, and mixtures thereof. A preferred first metal may be selected from the group consisting of nickel, ruthenium, rhodium, palladium, iridium, tungsten, alloys thereof, and mixtures thereof.

In addition, the first metal of the first catalyst may be present in various forms—metallic state, reduced forms, oxidized forms, hydrides, sulfides, alloys, complexes, and mixtures thereof.

Some examples of a second metal in the second reaction zone suitable for various embodiments may be selected from, but are not limited to, the group consisting of iron, cobalt, nickel, ruthenium, rhodium, palladium, osmium, iridium, platinum, lanthanides such as lanthanum, cerium, gadolinium, praseodymium, neodymium, dysprosium, holmium, ytterbium, samarium europium, erbium, terbium, lutetium, actinides such as thorium, uranium, and mixtures thereof. Preferred second metal includes, but is not limited to cobalt, nickel, ruthenium, rhodium, palladium, osmium, iridium, platinum.

Carriers suitable for the second catalyst of various embodiments may include, but are not limited to those compounds with high surface areas, particularly high internal surface areas. Preferred carriers include, but are not limited to one or more refractory metal oxides, one or more rare earth metal modified refractory metal oxides, one or more alkaline earth metal modified refractory metal oxides, and mixtures thereof. Examples of such metals for these metal oxides are selected from the group consisting of beryllium, magnesium, calcium, strontium, barium, boron, aluminum, zirconium, titanium, silicon, lanthanum, cerium, gadolinium, praseodymium, neodymium, dysprosium, holmium, ytterbium, samarium europium, erbium, terbium, lutetium, thorium, uranium, and mixtures thereof.

The high surface area carrier of the second catalyst has a substantially stable surface area under reaction conditions. The term "substantially stable" within this invention means that the loss of surface area under prevailing reaction conditions over time is less than 2% per hour.

It is also a preferred embodiment of the present invention that the thermal conductivity of the first catalyst is higher than the thermal conductivity of the second catalyst and subsequent catalysts, if there are any in the reaction system. In terms of thermal conductivity, it is within the scope of the present invention that the thermal conductivity of the first catalyst is at least 0.05 cal/cm$^2$/cm/second/° C. It is more preferred that the thermal conductivity is at least 0.10 cal/cm$^2$/cm/second/° C. It is more preferred that the thermal conductivity is at least 0.15 cal/cm$^2$/cm/second/° C.

The feed stream comprises a mixture of a hydrocarbon feedstock and an oxidizing agent. The mixture can be made as a single feed; or alternatively, the hydrocarbon feedstock and the oxidizing agent can be mixed prior to being introduced into the reaction zone.

The hydrocarbon feedstock may be selected from various compounds such as $C_1$ to $C_{10}$ organic compounds, including, but not limited to methane, ethane, propane, butanes, pentanes, hexanes, heptanes, octanes, nonanes, decanes, and mixtures thereof. Unsaturated hydrocarbons can be present, and/or used alone or in conjunction with saturated hydrocarbons too. Examples include, but are not limited to ethylene, acetylene, propylene, propyne, allene, $C_4$ to $C_{10}$ unsaturated compounds such as butene-1, butyne-1, and others, and mixtures thereof. Other heteroatom-containing compounds can be present in the hydrocarbon feedstock too. Examples include, but are not limited to CO, $CO_2$, methanol, methylamine, formaldehyde, formic acid, ethanol, acetaldehyde, acetic acid, other similar oxygen or nitrogen containing compounds, and mixtures thereof. Heavier hydrocarbons can be present in the hydrocarbon feedstock too. But it is preferred that they are present in small quantities to avoid excessive catalyst deactivation.

Light hydrocarbons, $C_1$-$C_5$ saturated or unsaturated compounds and/or their mixtures are preferred. For the present invention, it is more preferred to use a hydrocarbon feedstock comprising methane, or ethane, or propane, or butanes, and/or mixtures thereof. So-called natural gas and liquefied natural gas also are more preferred. They comprise primarily methane, ethane, propane and some other hydrocarbons in small quantities. When single hydrocarbon is used, a feed consists essentially of methane is most preferred. As already stated, if there is a recycle of certain product streams in the catalytic partial oxidation process of the present invention, some oxygen-containing compounds such as CO, $CO_2$, methanol, formaldehyde, formic acid, and others may also be present. The amounts would depend on the proportion of the recycle stream relative to the fresh feed.

While many different oxidizing agents may be used, it is preferred to use oxygen, air, other compositions containing oxygen, and mixtures thereof. The concentration of oxygen in the total feed stream is in the range of from about 0.01 vol % to about 50 vol %, preferably from about 0.1 vol % to about 35 vol %. Depending on the hydrocarbon feedstock, it is preferred to use oxygen concentrations outside the so-called flammable region to minimize operational risks.

Carbon to oxygen ratios are from about 1:1 to about 3.3:1, more preferably, from about 1.3:1 to about 2.5:1, and most preferably from about 1.7:1 to 2.3:1.

It is also within the scope of various embodiments that a side feed component may be added to the reaction system between the first and the second catalyst. A suitable side feed component comprises one or more of the elements selected from, but not limited to, a recycle gas, steam, hydrogen, carbon dioxide, carbon monoxide, methane, ethane, methanol, formaldehyde, formic acid, and mixtures thereof.

As discussed, at least two different catalysts may be used in various embodiments to catalytically and partially oxidize the hydrocarbon feedstock to produce an effluent stream. The effluent stream may comprises carbon monoxide and hydrogen. As already stated above and depending on the process conditions and feedstock compositions, there may be other by-products and/or co-products in the effluent stream, such as carbon dioxide, water, methanol, formaldehyde, formic acid, and others.

It is preferred that at least two catalysts are present in a reactor zone or a reaction system in series. There are many different ways to accomplish this arrangement for various embodiments. One way is to have the catalyst stacked in the reactor zone, with or without any space or other materials or piping between the catalyst layers. The reactor zone may be placed vertically, horizontally, or in any other suitable angle, arrangements, or combinations thereof known to those skilled in the art. It is also within the scope of the present invention to have two or more catalysts (as a non-exclusive example) mixed to form a gradient—100% of the first catalyst in the front, decreasing amounts of the first catalyst and increasing of the second catalyst along the reactor and finally 100% of the second catalyst in the backend of the reactor zone.

The feed stream may be initially contacted with a first catalyst in the front under selected and appropriate reaction conditions. The first catalyst may comprise a material, which has a shape of porous foam, gauze, mesh, honeycomb, wheel, monolith, mixtures thereof and other suitable forms. The material itself may be made of a first metal. Or, this material may be loaded with a first metal for the first catalyst.

The catalytic partial oxidation reaction may be carried out under a variety of reaction conditions. The conditions may be selected and adjusted in accordance with the feed stream selected, the hydrocarbon selected, the oxidizing agent selected, the first catalyst selected, the second catalyst selected, other catalyst(s) selected, the manner in which the catalysts are configured, the reactor type, the desired synthesis gas composition (Hydrogen to carbon monoxide ratio), whether any products or byproducts will be recycled, and others.

Generally, a flow rate, measured as space velocity, suitable for the present invention is in the range of from about 1,000 to about 10,000,000 NL/Kg/Hr (normal liters per kilograms of catalyst per hour), preferably from about 10,000 to about 1,000,000 NL/Kg/Hr, and more preferably from about 50,000 to about 500,000 NL/Kg/Hr. The flow rate can be adjusted to achieve the desired conversion, selectivity and catalyst life of the catalytic partial oxidation.

For various embodiments, an inlet temperature in the range of from about 15° C. to about 750° C. is considered suitable. The range is preferred to be in the range of from about 150 to about 550° C., more preferably from about 250° C. to about 450° C.

A catalyst degrades faster when the reactor is operated under pressure. At the high-pressure condition, the reactant density may be higher and the heat generation per unit (weight or volume or other suitable measurements) catalyst may also be higher. The porous catalyst carrier with poor heat (thermal) conductivity and high heat resistance may not sustain the severe conditions and the active first (or catalytic active) metal is sintered at a faster rate than the rate of sintering for a reaction operated at lower pressures.

The equilibrium conversion of the catalytic partial oxidation reaction changes with operating pressure. As a general rule, side reactions increase, hydrocarbon conversion, product selectivity, and catalyst life decreases as the pressure in the reactor increases. Pressure is in the range of from about 101 kPa to about 7,500 kPa; preferably from about 600 kPa to about 3500 kPa; and more preferably from about 1,200 kPa to about 2,500 kPa. The pressure can be adjusted as the reaction proceeds to obtain the desired reaction results.

Another aspect of the current invention relates to recycling of certain by-products or products back to the reaction system at a point between the inlet and the outlet. If two catalysts, a first catalyst and a second catalyst, are used, a preferred point of injecting the recycle stream is somewhere between the two catalyst beds.

Another aspect of the current invention relates to fuel cell. Steam is introduced in to the reactor between the two catalyst beds to do water gas shifting reaction to convert CO in syngas to $H_2$.

The conversion of a hydrocarbon, such as methane, in a process according to the instant invention is at least 50%, preferably at least about 60%, more preferably at least about 70%, and most preferably at least 75%.

Selectivity to $H_2$ is preferred to be at least 65 mol %, more preferably at least about 75 mol %, most preferably at least 85 mol %; and selectivity to CO is preferred to be least 65 mol %, more preferably at least about 75 mol %, most preferably at least 85 mol %.

Figure 2:
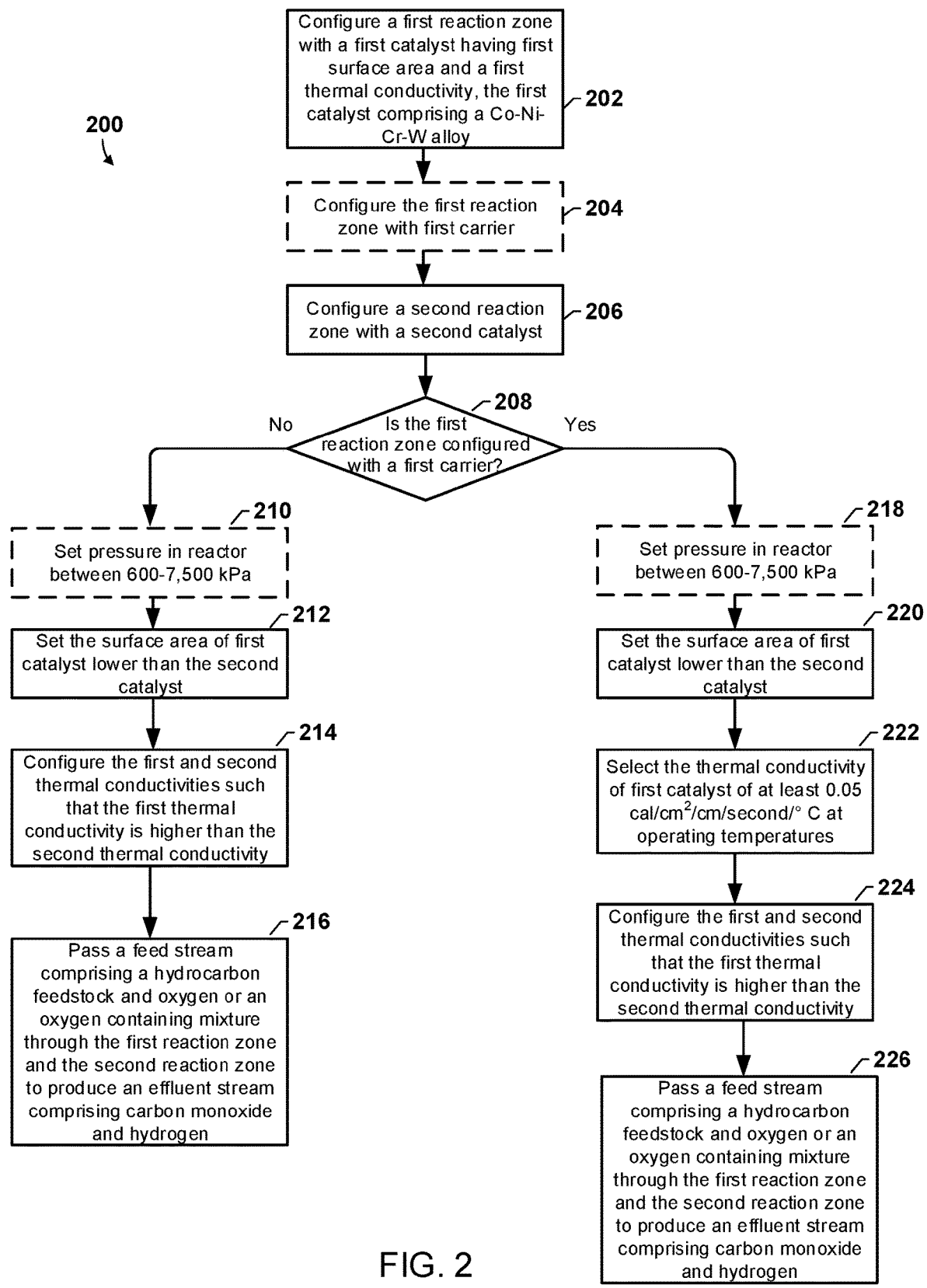
FIG. 2 is a process flow diagram illustrating various methods according to embodiment.

FIG. 2 is a flow diagram which illustrates various method embodiments 200. In a first step 202, the first reaction zone of a multizone furnace is configured with a first catalyst having a first surface area and a first thermal conductivity. The first catalyst comprises a Co—Ni—Cr—W alloy. In a second, optional step 204, the first catalyst in the first reaction zone may be provided with a carrier. In an embodiment, the first carrier is made of a high conductivity metal or alloy. In the next step 206, the second reaction zone may be configured with a second catalyst. Preferably, the second catalyst is configured with a second carrier.

In the next step 208, a determination may be made as to whether the first catalyst in the first reaction zone was configured with a first carrier. If the first catalyst was not configured with a first carrier (i.e., determination 208=NO), the following steps may be performed in no particular order. In step 210, the pressure in the reaction may optionally be set in a range between 600 and 7,500 kPa in step 210. In step 212, the amount and size of the first and second catalysts may be set such that the surface area of first catalyst lower than the surface area of the second catalyst. In step 214, the first and second catalysts may be selected such that the first thermal conductivity is higher than the second thermal conductivity. In step 216, a feed stream comprising a hydrocarbon feedstock and oxygen or an oxygen containing mixture is passed through the first reaction zone and the second reaction zone to produce an effluent stream comprising carbon monoxide and hydrogen.

If the first catalyst was configured with a first carrier (i.e., determination 208=YES), the following steps may be performed in no particular order. In step 218, the pressure in the reaction may optionally be set in a range between 600 and 7,500 kPa. In step 220, the amount and size of the first and second catalysts may be set such that the surface area of first catalyst lower than the surface area of the second catalyst. In step 220, the first catalyst is selected such that the thermal conductivity of first catalyst is at least 0.05 cal/cm$^2$/cm/ second/° C. at operating temperatures. In step 224, the first and second catalysts may be selected such that the first thermal conductivity is higher than the second thermal conductivity. In step 226, a feed stream comprising a hydrocarbon feedstock and oxygen or an oxygen containing mixture may be passed through the first reaction zone and the second reaction zone to produce an effluent stream comprising carbon monoxide and hydrogen.

WORKING EXAMPLES

A 60×60 mesh with 0.007 inch diameter wires made of a cobalt-nickel-chromium-tungsten alloy may be used as the first catalyst in the first reaction zone. Specifically, the alloy had the composition summarized in Table 2 below:

TABLE 2

| | |
|---|---|
| Carbon | 0.11 (wt %) |
| Manganese | 1.52 |
| Phosphorous | 0.013 |
| Sulfur | 0.002 |
| Silicon | 0.18 |
| Chromium | 19.77 |
| Nickel | 10.48 |
| Cobalt | 50.70 |
| Tungsten | 14.68 |
| Iron | 2.54 |

A 10 millimeter thick porous carrier supported Ni catalyst may be used as the second catalyst in the second reaction zone. A feed mixture containing 67 vol % methane and 33 vol % oxygen was passed through the reactor containing the above catalyst at a velocity of 15,000 cm$^3$/min. The feed is in the flammability range. However, with good mixing, there is no problem. A higher inlet temperature can get more reforming and thus higher $CH_4$ conversion and CO and $H_2$ selectivity. The problem with a higher inlet temperature is that it is easier to get pre-ignition before the mixed gas contacting the catalyst. The methane conversion was 86.7%, CO selectivity 92.8%, $H_2$ selectivity 95.9%, $CO_2$ selectivity 7.2% and space velocity 200,000 NL/kg/hr. Table 3 below compares the working example with the first comparative example.

TABLE 3

| | $CH_4$ Conversion | CO Selectivity | $H_2$ Selectivity | $CO_2$ Selectivity | SV, NL/kg/hr | Notes |
|---|---|---|---|---|---|---|
| Alloy Gauze (2 g) + Second catalyst (0.5 g) | 0.690 | 0.855 | 0.848 | 0.145 | 300000 | product is clean |
| Alloy Gauze (2 g) + Second catalyst (2.5 g) | 0.867 | 0.928 | 0.959 | 0.072 | 200000 | product is clean |
| Alloy Gauze (2 g) + Second catalyst (4.5 g) | 0.936 | 0.949 | 0.991 | 0.051 | 138000 | product is clean |
| Nickel Gauze (5 g) + second catalyst (14.5 g) | 0.861 | 0.841 | 0.99 | 0.148 | 46000 | carbon particle in product |

As can be seen in table 3 above, the alloy gauze may have a slightly higher $CH_4$ conversion than the nickel gauze. However, the alloy gauze may have a significantly higher CO selectivity. The $H_2$ selectivity of the alloy and the nickel are essentially the same. The $CO_2$ selectivity of the alloy may be significantly lower than the nickel gauze. This is beneficial because $CO_2$ is inert and therefore not useful as a fuel. That is, each mole of feed methane includes one mole of carbon. Thus, for each mole of $CO_2$ produced, one less mole of CO is available for use. In addition, the space velocity of the of the alloy gauze is may be 4× or more greater than the nickel gauze. Additionally, the effluent gas is clean in contrast to the effluent gas from a reactor using a nickel catalyst which resulted in effluent gas with carbon particles.

Comparative Example 1

A 20 millimeter diameter and 5 millimeter thick Ni gauze with 60 mesh may be used as the first catalyst in the first reaction zone. A 10 millimeter thick porous carrier supported Ni catalyst with 13% Ni and 12% La may be used as the second catalyst in the second reaction zone. A feed mixture containing 67 vol % methane and 33 vol % oxygen. The higher inlet temperature can get more reforming and thus higher $CH_4$ conversion and CO and $H_2$ selectivity. The problem for higher inlet temperature is easier to get pre-ignition before the mixed gas contacting the catalyst.) was passed through the reactor containing above catalyst at a space velocity of 46,000 per hour. Methane conversion 86.1%, CO selectivity 84.1%, $H_2$ selectivity 99.9%, inlet temperature 235° C., Outlet temperature 920° C.

Comparative Example 2

A 20 millimeter diameter and 3 millimeter thick Rh gauze with 80 mesh may be used as the first catalyst in the first reaction zone. A 10 millimeter thick porous carrier supported Rh catalyst with 4% Rh and 8% La may be used as the second catalyst in the second reaction zone. A feed mixture containing 67 vol % methane and 33 vol % oxygen was passed through the reactor containing above catalyst at a space velocity of 128,000 per hour. Methane conversion 96.1%, CO selectivity 95.6%, $H_2$ selectivity 96.4%, inlet temperature 235° C., Outlet temperature 875° C.

The examples described above are for illustration purpose only. They are not intended, and should not be interpreted, to limit either the scope or the spirit of this invention. Those skilled in the art would appreciate that many other variations or substitutes can be used as equivalents for the purposes of this invention, which is defined solely by the written description and the claims.

INDUSTRIAL APPLICABILITY

The catalytic partial oxidation reaction process of the various embodiments may (a) eliminate the catalyst sintering to extend the catalyst life, (b) reduce the temperature rise in the front of the reactor system to reduce the initial complete oxidation of hydrocarbon feed, and/or (c) maintain as high as possible a temperature in the rest of the reactor system in order to maintain a reasonable reaction rate for reforming reactions to convert undesirable complete oxidation products, water and $CO_2$, to form additional synthesis gas (namely, a mixture of hydrogen and CO), which is expected to increasingly become the starting material of choice for energy production and/or feedstock for industrial chemical processes.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

I claim:

1. A catalytic partial oxidation process comprising:
passing a feed stream comprising a hydrocarbon feedstock and oxygen or an oxygen containing mixture through a reactor having at least a first reaction zone and a subsequent second reaction zone; and
producing an effluent stream comprising carbon monoxide and hydrogen,
wherein:
the first reaction zone comprises a first catalyst having a first surface area and a first thermal conductivity, the first catalyst comprising a Co—Ni—Cr—W alloy in which each of Co, Ni, Cr, and W are present in the alloy;
the second reaction zone comprises a second catalyst having a second surface area and a second thermal conductivity, the second catalyst comprising a second metal supported on a carrier;
the first surface area of the first catalyst is lower than the second surface area of the second catalyst; and
a pressure in said reactor is between about 600 kPa and about 7,500 kPa; and
a CO selectivity is greater than 92.5% and $CO_2$ selectivity is less than 7.2%.

2. The catalytic partial oxidation process of claim 1, wherein the Co—Ni—Cr—W alloy comprises 9.0-11.0 wt % Ni, 19.0-21.0 wt % Cr, 14.0-16.0 wt % W.

3. The catalytic partial oxidation process of claim 1, wherein:
the first thermal conductivity of the first catalyst is at least 0.05 cal/cm$^2$/cm/second/° C.; and
the first thermal conductivity of the first catalyst is higher than the second thermal conductivity of the second catalyst.

4. The catalytic partial oxidation process of claim 1, wherein the first thermal conductivity of the first catalyst is at least 0.10 cal/cm$^2$/cm/second/° C.

5. The catalytic partial oxidation process of claim 1, wherein the second metal is selected from the group consisting of iron, cobalt, nickel, ruthenium, rhodium, palladium, osmium, iridium, platinum, lanthanum, cerium, gadolinium, praseodymium, neodymium, dysprosium, holmium, ytterbium, samarium europium, erbium, terbium, lutetium, thorium, uranium, and mixtures thereof.

6. The catalytic partial oxidation process of claim 1, wherein the second catalyst further comprises a promoter metal selected from the group consisting of lanthanum, cerium, gadolinium, praseodymium, neodymium, dysprosium, holmium, ytterbium, samarium, europium, erbium, terbium, lutetium, thorium, uranium, and mixtures thereof.

7. The catalytic partial oxidation process of claim 1, wherein a side feed component is added between the first reaction zone and the second reaction zone, and wherein the side feed component is selected from the group consisting of a recycle gas, steam, hydrogen, carbon dioxide, carbon monoxide, methane, and mixtures thereof.

8. The catalytic partial oxidation process of claim 1, wherein the feed stream has a flow rate in the range of from about 1,000 to about 10,000,000 normal liters per kilograms of catalyst per hour.

9. The catalytic partial oxidation process of claim 8, wherein the flow rate for the two catalysts is in the range of from about 10,000 to 1,000,000 normal liters per kilograms of catalyst per hour.

10. The catalytic partial oxidation process of claim 1, wherein the carrier of the second catalyst has a substantially stable surface area having a loss of surface area that is less than 2% per hour.

11. The catalytic partial oxidation process of claim 10, wherein the carrier of the second catalyst is in a shape selected from the group consisting of sphere, pellet, trilobe, particulate, bead, ring, granule, and mixtures thereof.

12. The catalytic partial oxidation process of claim 10, wherein the carrier of the second catalyst comprises an oxide of a metal selected from the group consisting of aluminum, zirconium, magnesium, titanium, silicon, lanthanum, cerium, gadolinium, praseodymium, neodymium, dysprosium, holmium, ytterbium, samarium, europium, erbium, terbium, lutetium, thorium, uranium, and mixtures thereof.

13. The catalytic partial oxidation process of claim 10, wherein the second catalyst further comprises a promoter metal selected from the group consisting of lanthanum, cerium, gadolinium, praseodymium, neodymium, dysprosium, holmium, ytterbium, samarium, europium, erbium, terbium, lutetium, thorium, uranium, and mixtures thereof.

14. The catalytic partial oxidation process of claim 1, wherein the carrier of the second catalyst is selected from the group consisting of one or more refractory metal oxides, one or more rare earth modified refractory metal oxides, one or more alkaline earth metal modified refractory metal oxides, and mixtures thereof.

15. The catalytic partial oxidation process of claim 1, wherein the feed stream has an inlet temperature is in the range of from about 15° C. to about 750° C.

16. The catalytic partial oxidation process of claim 15, wherein the feed stream has an inlet temperature that is in the range of from about 250° C. to about 450° C.

17. The catalytic partial oxidation process of claim 1, wherein the feed stream has an atomic ratio of carbon to oxygen in the range of from about 1.7:1 to about 2.3:1.

18. A catalytic partial oxidation process comprising:
passing a feed stream comprising a hydrocarbon feedstock and oxygen or an oxygen containing mixture through a reactor having at least a first reaction zone and a subsequent second reaction zone; and
producing an effluent stream comprising carbon monoxide and hydrogen,
wherein:
the first reaction zone contains a first catalyst having a first surface area and a first thermal conductivity, the first catalyst being supported and comprising a first metal of the first catalyst comprising a Co—Ni—Cr—W alloy in which each of Co, Ni, Cr, and W are present in the alloy, wherein the first surface area is less than about 1.0 square meter per gram (m$^2$/g);
the second reaction zone contains a second catalyst having a second surface area and a second thermal conductivity, the second catalyst comprising a second metal supported on a carrier;
the first reaction zone comprises a first catalyst carrier comprising one or more metallic substances with a high thermal conductivity;
the first surface area of the first catalyst is lower than the second surface area of the second catalyst;
the first thermal conductivity of the first catalyst is at least 0.05 cal/cm$^2$/cm/second/° C. at;
the first thermal conductivity of the first catalyst is higher than the second thermal conductivity of the second catalyst; and
a CO selectivity is greater than 92.5% and $CO_2$ selectivity is less than 7.2%.

19. The catalytic partial oxidation process of claim 18, wherein:
the second metal is selected from the group consisting of iron, cobalt, nickel, ruthenium, rhodium, palladium, osmium, iridium, platinum, lanthanum, cerium, gadolinium, praseodymium, neodymium, dysprosium, holmium, ytterbium, samarium, europium, erbium, terbium, lutetium, thorium, uranium, and mixtures thereof.

20. The catalytic partial oxidation process of claim 18, wherein:
the carrier of the second catalyst is selected from the group consisting of one or more refractory metal oxides, one or more rare earth modified refractory metal oxides, one or more alkaline earth metal modified refractory metal oxides, and mixtures thereof; and
the carrier of the second catalyst is in a shape selected from the group consisting of sphere, pellet, trilobe, particulate, bead, ring, granule, and mixtures thereof.

21. The catalytic partial oxidation process of claim 18, wherein the second catalyst further comprises a promoter metal selected from the group consisting of lanthanum, cerium, gadolinium, praseodymium, neodymium, dysprosium, holmium, ytterbium, samarium, europium, erbium, terbium, lutetium, thorium, uranium, and mixtures thereof.

22. The catalytic partial oxidation process of claim 18, wherein:
the feed stream has a flow rate is in the range of from about 10,000 to about 1,000,000 normal liters per kilograms of catalyst per hour;
the feed stream has an inlet temperature that is in the range of from about 250° C. to about 450° C.;
a reactor pressure is in the range of from about 600 kPa to about 7,500 kPa; and
the feed stream has an atomic ratio of carbon to oxygen in the range of from about 1.7:1 to about 2.3:1.

23. The catalytic partial oxidation process of claim 18, wherein a side feed component is added optionally between the first reaction zone and the second reaction zone, and wherein the feed component is selected from the group consisting of a recycle gas, steam, hydrogen, carbon dioxide, carbon monoxide, methane, and mixtures thereof.

24. The catalytic partial oxidation process of claim 18, wherein the Co—Ni—Cr—W alloy comprises 9.0-11.0 wt % Ni, 19.0-21.0 wt % Cr, 14.0-16.0 wt % W.

25. A catalytic partial oxidation process comprising:
passing a feed stream comprising a hydrocarbon feedstock and oxygen or an oxygen containing mixture through a reactor having at least a first reaction zone and a subsequent second reaction zone; and
producing an effluent stream comprising carbon monoxide and hydrogen,
wherein:
the first reaction zone contains a first catalyst having a first surface area and a first thermal conductivity, the first catalyst being unsupported and comprising the first catalyst comprising a Co—Ni—Cr—W alloy in which each of Co, Ni, Cr, and W are present in the alloy, wherein the first surface area is less than about 1.0 square meter per gram ($m^2/g$);
the second reaction zone contains a second catalyst having a second surface area and a second thermal conductivity, the second catalyst comprising a second metal supported on a carrier;
the first surface area of the first catalyst is lower than the second surface area of the second catalyst;
the first thermal conductivity of the first catalyst is higher than the second thermal conductivity of the second catalyst; and
a CO selectivity is greater than 92.5% and $CO_2$ selectivity is less than 7.2%.

26. The catalytic partial oxidation process of claim 25, wherein the second metal is selected from the group consisting of iron, cobalt, nickel, ruthenium, rhodium, palladium, osmium, iridium, platinum, lanthanum, cerium, gadolinium, praseodymium, neodymium, dysprosium, holmium, ytterbium, samarium, europium, erbium, terbium, lutetium, thorium, uranium,
and mixtures thereof.

27. The catalytic partial oxidation process of claim 25, wherein the first thermal conductivity of the first catalyst is at least 0.10 cal/$cm^2$/cm/second/° C.

28. The catalytic partial oxidation process of claim 25, wherein the Co—Ni—Cr—W alloy comprises 9.0-11.0 wt % Ni, 19.0-21.0 wt % Cr, 14.0-16.0 wt % W.

* * * * *